United States Patent
Shinzawa

(10) Patent No.: US 7,028,532 B2
(45) Date of Patent: Apr. 18, 2006

(54) FUEL PROPERTY DETERMINATION SYSTEM

(75) Inventor: Motohiro Shinzawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 100 days.

(21) Appl. No.: 10/770,389

(22) Filed: Feb. 4, 2004

(65) Prior Publication Data

US 2004/0154386 A1    Aug. 12, 2004

(30) Foreign Application Priority Data

Feb. 10, 2003    (JP) ............................ 2003-031832

(51) Int. Cl.
*G01N 33/22* (2006.01)

(52) U.S. Cl. .................................. 73/35.02; 73/53.05
(58) Field of Classification Search ............... 73/35.02, 73/53.05
See application file for complete search history.

(56) References Cited

U.S. PATENT DOCUMENTS 4,142,419 A * 3/1979 Fenne et al. ................. 73/440
6,283,096 B1   9/2001 Kimura

FOREIGN PATENT DOCUMENTS

| JP | 61190131 A * | 8/1986 |
| JP | 3-45181 Y2 | 9/1991 |
| JP | 11-107820 A | 4/1999 |

OTHER PUBLICATIONS

U.S. Appl. No. 10/770,550, filed Feb. 4, 2004, Shinzawa.

* cited by examiner

*Primary Examiner*—Eric S. McCall
*Assistant Examiner*—Jermaine Jenkins
(74) *Attorney, Agent, or Firm*—Foley & Lardner LLP

(57) ABSTRACT

A fuel property determination system for an internal combustion engine is comprised of a specific gravity detecting section which detects a specific gravity of fuel used in the engine and a fuel property detecting section which detects at least one of a cetane number, an octane number, an evaporation point, a heat of consumption and an aromatics content as a fuel property, on the basis of the specific gravity.

10 Claims, 8 Drawing Sheets

FUEL PROPERTY DETERMINATION SYSTEM

BACKGROUND OF THE INVENTION

The present invention relates a system for determining a property of fuel used in an internal combustion engine, and more particularly to a fuel property determination system for determining fuel properties such as a cetane number, octane number or the like of fuel used in an internal combustion engine.

Japanese Examined Utility Model Application No. 3-45181 discloses a cetane number sensor for detecting a fuel property of fuel used in an internal combustion engine. By determining a centane number of light oil actually used by means of the cetane sensor, a proper fuel injection is executed according to the determined fuel property to stably operate the internal combustion engine.

A cetane number determination method employing this cetane number sensor is executed on the assumption that a viscosity and a center number of light oil have a proportional relationship. As a means for measuring a viscosity of light oil, there are provided a pendulum which sinks in light oil of a fuel tank by gravity and a sink time measuring mechanism which measures a sink time of the pendulum affected by viscosity. The viscosity of the light oil is determined from the sink time, and a cetane number of the light oil is determined by correcting the obtained viscosity in temperature.

Japanese Published Patent Application No. 11-107820 discloses a combustion control system of a diesel engine. This combustion control system comprises an in-cylinder pressure sensor for detecting an ignition timing, in order to vary the ignition timing or an EGR ratio when an actual ignition timing deviates from a target ignition timing due to dispersion of a cetane number of fuel in markets and the like. Consequently, this system is arranged such that the fuel property such as a centane number influences a difference between the actual ignition timing and the target ignition timing.

SUMMARY OF THE INVENTION

The cetane number determination method in the Japanese Examined Utility Model Application No. 3-45181 is executed on the presumption that a viscosity and a cetane number are in a proportional relationship such that the cetane number increases as the viscosity increases.

However, inventors of the present invention proved that it was difficult to accurately detect a cetane number from a viscosity. More specifically, the inventors has searched a relationship between the viscosity and the center number of light oil as shown in FIG. 5 and concluded that a correlation between the viscosity and the cetane number of light oil is low and rather has an inverse proportional relationship so that the cetane number decreases as the viscosity increases. Further, this method of the former related art requires to provide a complicated mechanism for measuring a viscosity measurement, and thereby limiting the design of the fuel tank and degrading the productivity of the system for this former method. Furthermore, since it is supposed that a friction of a viscosity measuring system in the fuel tank will be varied if the vehicle is put in an inclined state, it is difficult to accurately measure the viscosity by mean of this method.

On the other hand, since the combustion control system disclosed in Japanese Published Patent Application No. 11-107820 is arranged to determine a cetane number based on a difference between the actual ignition timing and the target ignition timing, it is necessary to comprise an expensive in-cylinder pressure sensor, such as a piezoresistance effect type pressure sensor. Further, since disturbances except for the cetane number also affect the difference of the actual and target ignition timings, it is difficult to accurately detect the cetane number only from this difference.

It is therefore an object of the present invention to provide a fuel property determination system for an internal combustion engine which system is capable of practically and accurately determining a property of fuel in use, regardless of kinds of engines such as a diesel engine or a gasoline engine.

An aspect of the present resides in a fuel property determination system which is for an internal combustion engine, and which comprises a specific gravity detecting section that detects a specific gravity of fuel used in the engine and a fuel property detecting section that detects at least one of a cetane number, an octane number, an evaporation point, a heat of consumption and an aromatics content as a fuel property, on the basis of the specific gravity.

Another aspect of the present invention resides in a method of determining a property of fuel used in an internal combustion engine. This method comprises an operation of detecting a specific gravity of fuel used in the engine, and an operation of detecting at least one of a cetane number, an octane number, an evaporation point, a heat of consumption and an aromatics content as a fuel property, on the basis of the specific gravity.

The other objects and features of this invention will become understood from the following description with reference to the accompanying drawings.

DETAILED DESCRIPTION OF THE INVENTION

There is discussed a preferred embodiment of a fuel property determination system according to the present invention with reference to the drawings.

Figure 1:
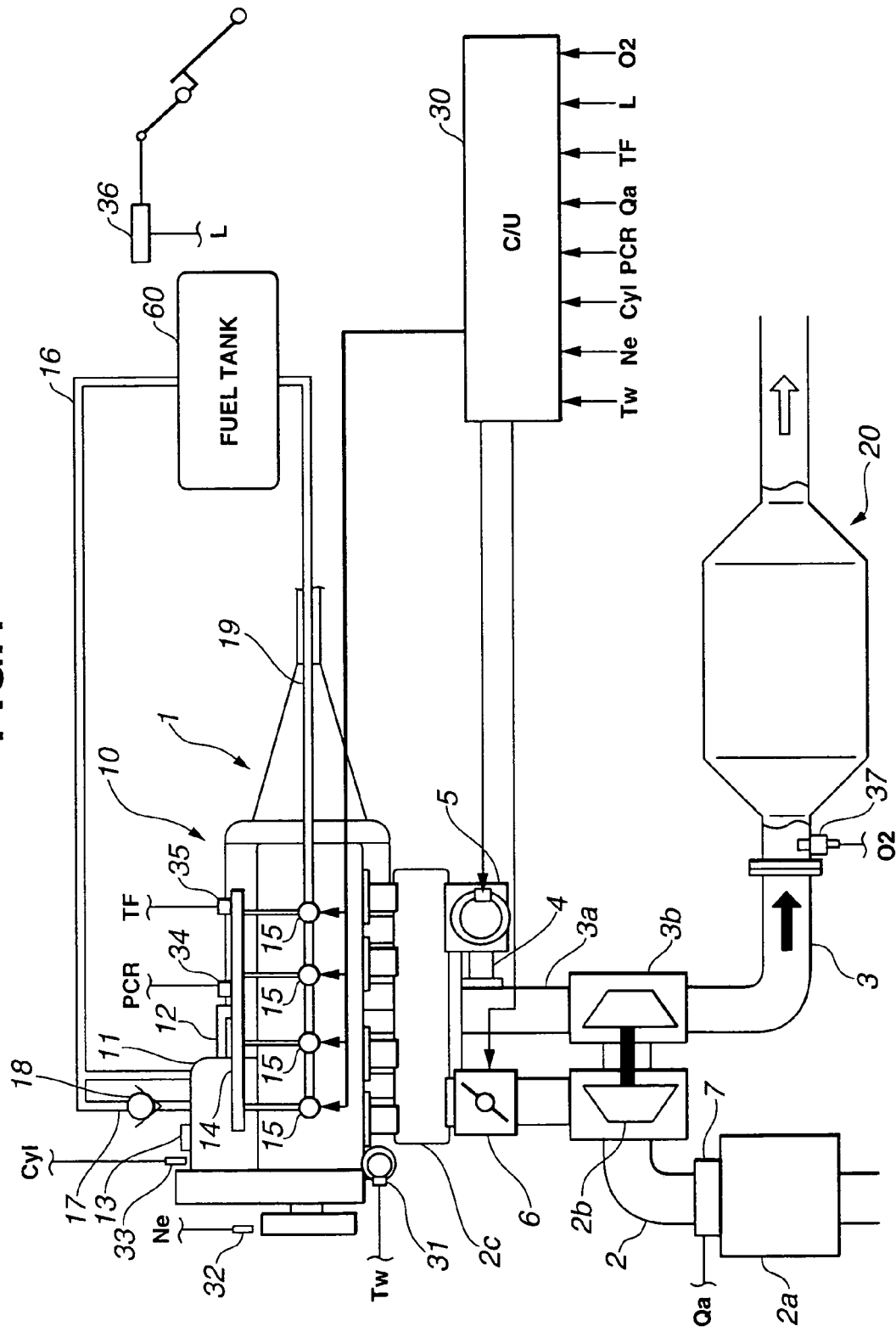
FIG. 1 is a schematic view showing an engine system which comprises a fuel property determination system according to the present invention.

FIG. 1 shows an engine system to which the fuel property determination system according to the present invention is applied. An internal combustion engine of this engine system is a diesel engine 1 which uses light oil as fuel.

As shown in FIG. 1, an exhaust gas passage 3 of diesel engine 1 is connected to an exhaust side of engine 1. More specifically, an exhaust outlet passage 3a is directly connected to exhaust ports of engine 1. Exhaust outlet passage 3a performs an upstream portion of an exhaust passage 3 of engine 1, and its downstream side is connected to a turbine chamber for a turbine 3b of a turbocharger. An exhaust gas processing apparatus, which includes an oxidation catalyst and a NOx catalyst, is connected to a downstream side of the turbine chamber in series. An air/fuel ratio sensor 37 functioning as actual air/fuel ratio detecting means is disposed at an inlet port of casing 20. This air/fuel ratio sensor 37 is of a type which detects an oxygen density in exhaust gases using an oxygen-ion conductive solid electrolyte and which obtains the air/fuel ratio from the detected oxygen density.

An EGR passage 4 is disposed between an intake collector 2c of an intake passage 2 and exhaust outlet passage 3a to recirculate a part of exhaust gases from exhaust outlet passage 3a to intake corrector 2c. An EGR valve 5 is disposed in EGR passage 4. An opening of EGR valve 5 is continuously variable according to an operation of a stepping motor connected to EGR valve 5.

An air cleaner 2a is installed at an upstream side of intake passage 2, and an airflow meter 7 functioning as intake air quantity detecting means is connected to an outlet of air cleaner 2a. A compressor 2b of the turbocharger is disposed at an downstream of airflow meter 7. An intake throttle valve 6, which is opened and closed by an actuator such as a stepping motor, is disposed between compressor 2b and intake collector 2c.

A fuel supply line of engine 1 comprises a fuel tank 60 for storing light oil of diesel engine fuel, a fuel supply passage 16 for supplying the fuel to a fuel injection apparatus 10 of engine 1 and a fuel return passage 19 for returning return-fuel (spill fuel) from fuel injection apparatus 10 to fuel tank 60.

Fuel injection apparatus 10 of engine 1 is a common-rail type fuel injection apparatus, and mainly comprises a supply pump 11, a common-rail (accumulator) 14, and a fuel injector 15 provided for each cylinder of engine 1. Fuel pressurized by supply pump 11 is supplied to common-rail 14 through fuel supply passage 12 and is temporally stored in common-rail 14. Then, the pressurized fuel in common-rail 14 is distributed to each fuel injector 15 for each cylinder of engine 1.

A pressure sensor 34 for detecting a fuel pressure in common-rail 14 and a temperature sensor 35 for detecting a temperature of the fuel in common-rail 14 are attached to common-rail 14. A part of fuel discharged from supply pump 11 is returned to fuel supply passage 16 through an overflow passage 17 provided with a one-way valve 18 to control the fuel pressure in common-rail 14. More specifically, there is provided a pressure control valve 13 for varying a passage cross-sectional area of overflow passage 17. An engine control unit 30 outputs a duty signal to pressure control valve 13 to vary the passage cross-sectional area of overflow passage 17. By this cross-sectional area varying operation, an actual fuel discharge quantity from supply pump 11 to common-rail 14 is controlled, and therefore the fuel pressure in common-rail 14 is controlled.

Fuel injector 15 is an electronic injector which is opened and closed in response to ON-OFF signal outputted from engine control unit 30. In response to ON signal, fuel injector 15 injects fuel into a combustion chamber, and in response to OFF signal, fuel injector 15 stops the fuel injection. A fuel injection quantity injected from fuel injector 15 is increased as a period of outputting ON signal to fuel injector 15 is elongated, and the fuel injection quantity is increased as the fuel pressure in common-rail 14 is increased.

Engine control unit 30 receives an intake air quantity indicative signal Qa from airflow meter 7, a water temperature indicative signal Tw from a water temperature sensor 31, a crank angle signal indicative of engine speed (revolution speed of engine 1) Ne from a crank angle signal 32, a cylinder distinguish signal Cyl from a cylinder distinguishing crank angle sensor 33, a common-rail pressure indicative signal PCR from pressure sensor 34, a fuel temperature indicative signal TF from temperature sensor 35 for detecting fuel temperature, a accelerator opening signal indicative of load L from an accelerator opening sensor 36 for detecting a depression quantity of an accelerator pedal corresponding to a load to be generated, and a signal O2 indicative of the oxygen density from air/fuel ratio sensor 37.

Figure 10:
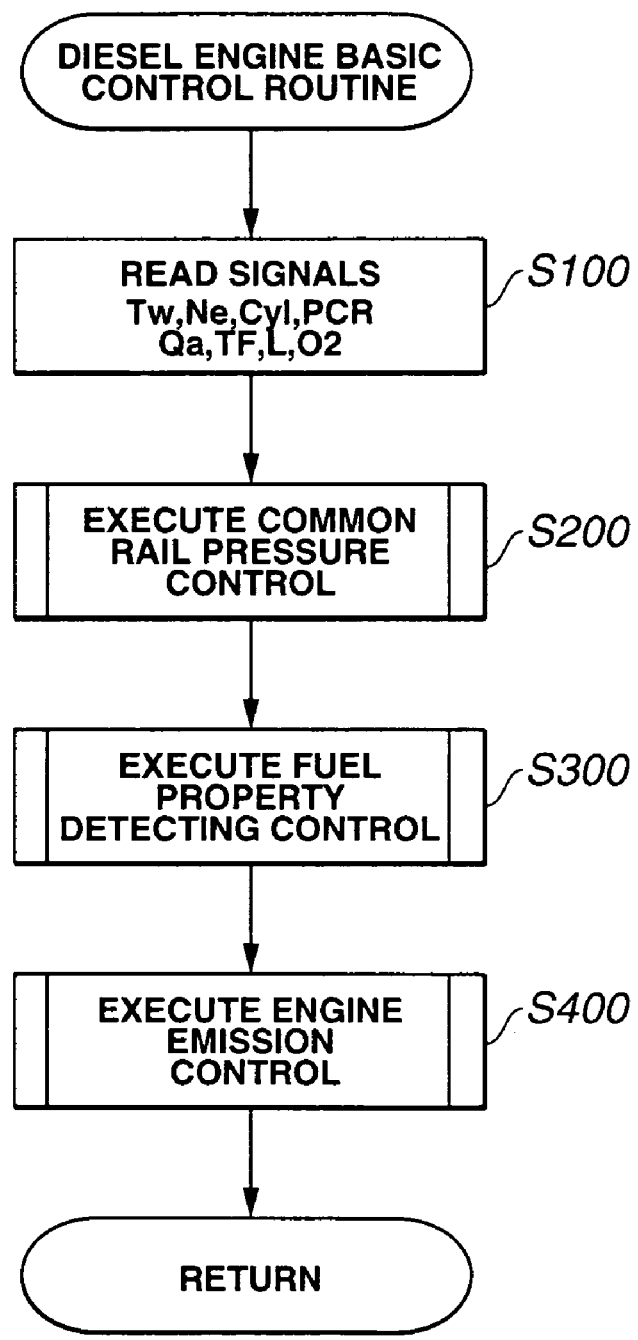
FIG. 10 is a flowchart showing a basic control routine of a diesel engine of the engine system.

Subsequently, there is discussed a control executed by engine control unit 30 with reference to flowcharts shown in FIGS. 10 through 12. This control includes a fuel property determination processing according to the present invention. FIG. 10 shows a basic control routine for controlling diesel engine 1.

At step S100 in FIG. 10 control unit 30 reads water temperature indicative signal Tw, engine speed indicative signal Ne, cylinder distinguishing signal Cyl, common-rail pressure indicative signal PCR, intake air quantity indicative signal Qa, fuel temperature indicative signal TF, accelerator opening indicative signal L, and oxygen density indicative signal O2 from sensors 31, 32, 33, 34, 35, 36, 37 and 7, respectively.

At step 200 control unit 30 executes a common-rail pressure control. More specifically, in the common-rail pressure control, control unit 30 retrieves a target standard pressure PCRO of common-rail 14 from a predetermined map previously stored in a ROM of control unit 30, and executes a feedback control of a pressure control valve 13 so as to bring the actual common-rail pressure closer to target standard pressure PCRO.

At step 300 control unit 30 executes a fuel property detecting control (fuel property determination control). At step 400 subsequent to the execution of step S300 control unit 30 executes an engine emission control.

Figure 11:
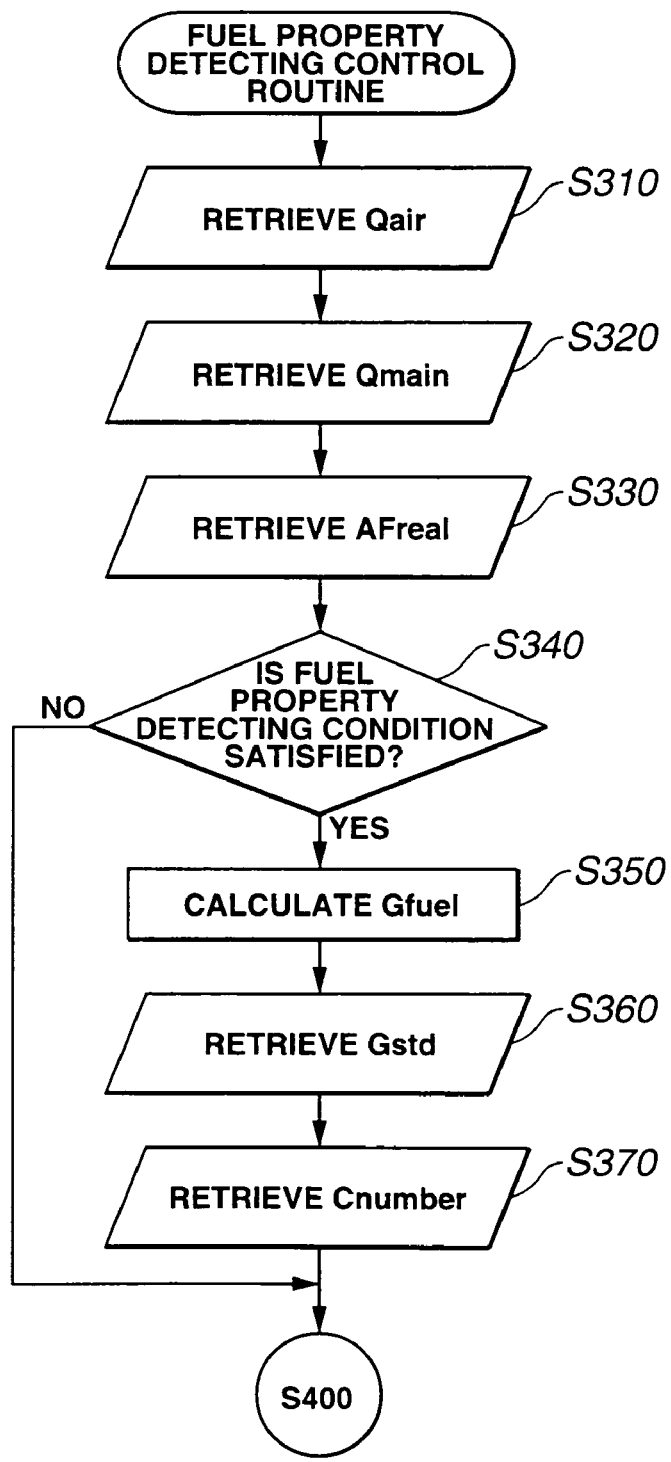
FIG. 11 is a flowchart showing a control routine for detecting a fuel property in accordance with the present invention.
Figure 12:
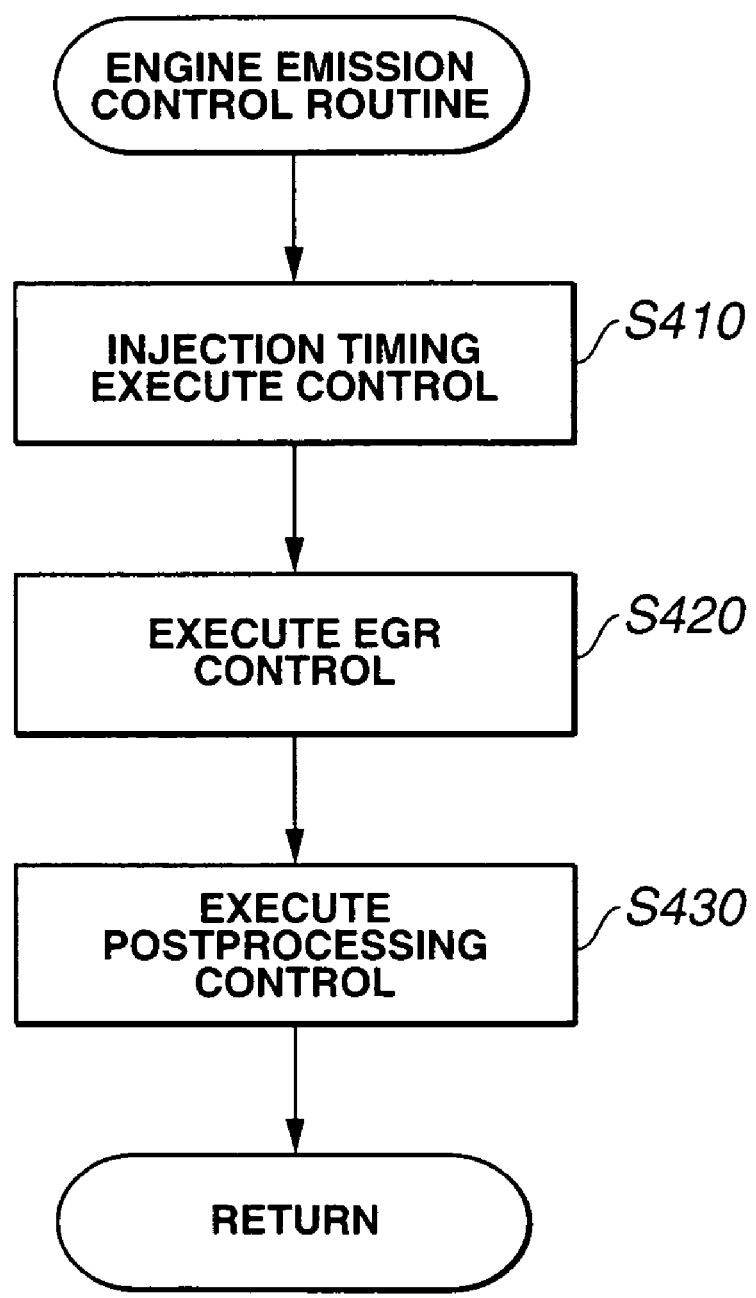
FIG. 12 is a flowchart showing an emission control routine of the engine.

Referring to a flowchart of FIG. 11, there is discussed the subroutine of the fuel property detecting control executed at step S300 in detail. By executing this subroutine, control unit 30 can finely detect the property of fuel used in engine 1.

At step S310 control unit 30 retrieves the signal Qa of airflow meter 7 from table data which represents a relationship between the signal Qa of airflow meter and an intake air quantity Qair while employing the signal Qa as a parameter, and which has been previously stored in ROM of control unit 30.

At step S320 control unit 30 retrieves a main fuel injection quantity Qmain from a predetermined map which represents a relationship among main fuel injection quantity Qmain, engine speed Ne and load L while employing engine speed Ne and load L as parameters, and which has been previously stored inn ROM of control unit 30. Main fuel injection quantity Qmain may be obtained by other method. For example, it may be obtained by retrieving a fuel injection period Mperiod of a fuel injection system from a map which represents a relationship among fuel injection period Mperiod, engine speed Ne and load L while employing engine speed Ne and load L as parameters, and which has been previously stored in ROM of control unit 30. Further, control unit 30 retrieves main fuel injection quantity Qmain from a map which represents a relationship among main fuel injection quantity Qmain, fuel injection period Mperiod and common-rail pressure PCR while employing fuel injection period Mperiod and common-rail pressure PCR as parameters, and which has been previously stored in ROM of control unit 30.

At step S330 control unit 30 retrieves an actual air/fuel ratio AFreal from table data which represents a relationship between actual air/fuel ratio AFreal and signal O2 outputted from air/fuel ratio sensor 37 and which has been previously stored in ROM of control unit 30.

At step S340 control unit 30 determines whether or not a fuel property detecting condition is satisfied. For example, although an internal combustion engine for an automotive vehicle is generally provided with an exhaust gas recirculation system including an EGR valve in order to reduce NOx in exhaust gases, it is necessary to correct the exhaust gas recirculation to accurately obtain the actual air/fuel ratio since the exhaust air/fuel ratio is shifted to a rich side when the exhaust gases are recirculated according to the engine operating condition. Accordingly, there is a possibility that the detection accuracy of the actual air/fuel ratio is degraded by the correction. It is preferable that outputting the detection command for detecting the actual air/fuel ratio is limited only when the exhaust gas recirculation is stopped. Accordingly, one of the fuel property detecting condition is a condition when the exhaust gas recirculation is stopped.

When the determination at step S340 is negative, that is, when the fuel property detecting condition is not satisfied, this subroutine is terminated, and therefore the routine proceeds to step S400. When the determination at step S340 is affirmative, that is, when the fuel property detecting condition is satisfied, the program proceeds to step S350.

At step S350 control unit 30 obtains an actual fuel supply weight Gmain on the basis of intake air quantity Qair obtained at step S310 and actual air/fuel ratio AFreal obtained at step S330. More specifically, control unit 30 calculates actual fuel supply weight Gmain by dividing intake air quantity Qair by actual air/fuel ratio AFreal (Gmain=Qair÷AFreal). Further, control unit 30 obtains an actual specific gravity Gfuel on the basis of actual fuel supply weight Gmain and main fuel injection quantity Qmain obtained at step S320. More specifically, control unit 30 calculates actual specific gravity Gfuel by dividing actual fuel supply weight Gmain by main fuel injection quantity Qmain (Gfuel=Gmain÷Qmain).

At step S360 control unit 30 obtains a standard specific gravity Gstd which is a specific gravity at a standard temperature 20° C. More specifically, control unit 30 retrieves standard specific gravity Gstd from a map which represents a relationship among standard specific gravity Gstd, actual specific gravity Gfuel and fuel temperature TF while employing actual specific gravity Gfuel and fuel temperature TF as parameters, and which has been previously stored in ROM of control unit 30.

At step S370 control unit 30 retrieves a fuel property such as a cetane number Cnumber from table data which represents a relationship between cetane number Cnumber and standard specific gravity Cstd while employing standard specific gravity Cstd as a parameter, and which has been previously stored in ROM of control unit 30.

Inventors of the present invention have searched a relationship between a standard specific gravity and properties of fuel in markets. Herein, there is discussed the relationship between standard specific gravity and properties of fuel in markets with reference to graphs shown in FIGS. 2 through 9. FIGS. 2 through 5 show properties of light oil, and FIGS. 6 through 9 show properties of gasoline.

Figure 2:
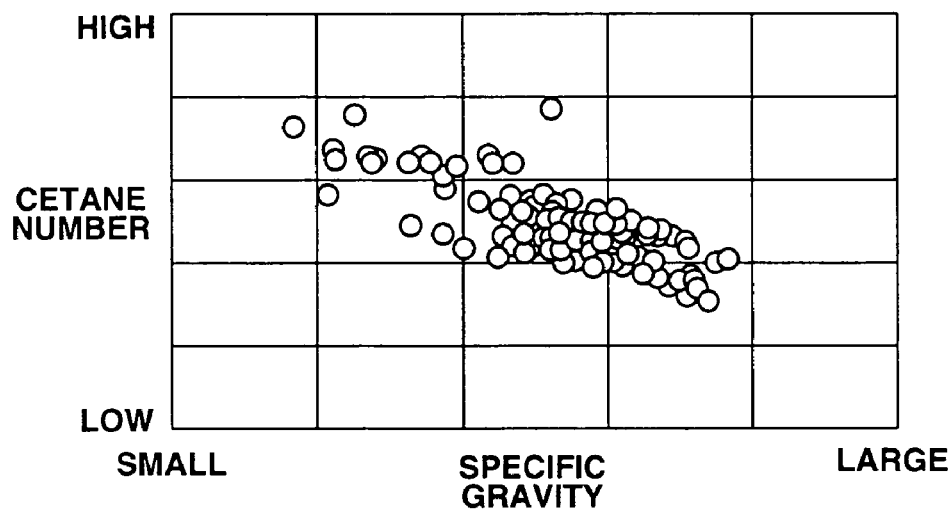
FIG. 2 is a graph showing a relationship between a specific gravity and a cetane number of light oil.
Figure 3:
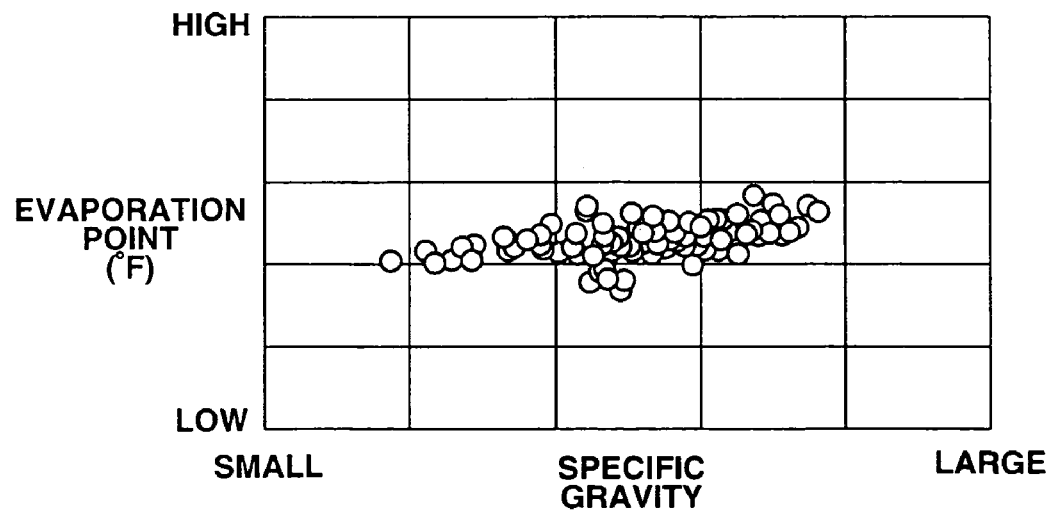
FIG. 3 is a graph showing a relationship between the specific gravity and an evaporation property (10% evaporation point) of light oil.
Figure 4:
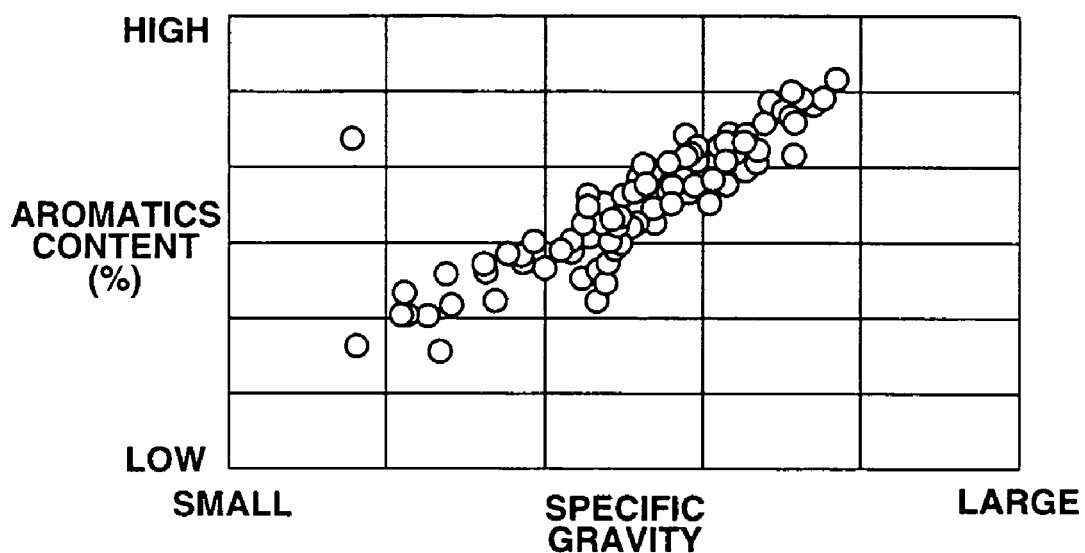
FIG. 4 is a graph showing a relationship between the specific gravity and an aromatics content of light oil.
Figure 5:
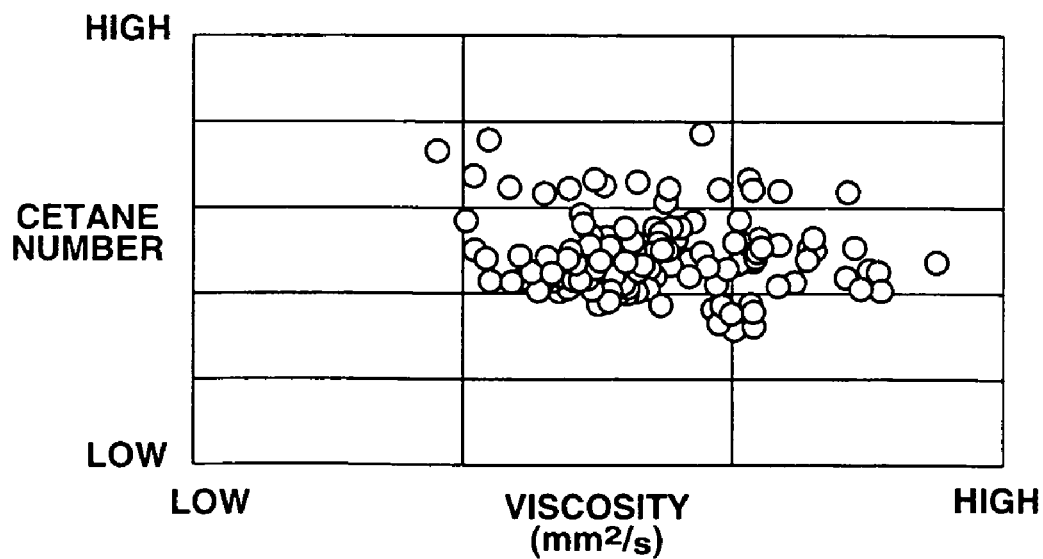
FIG. 5 is a graph showing a relationship between a viscosity and the cetane number of light oil.

In case of light oil, as shown in FIG. 2, a cetane number is decreased in inverse proportion to the standard specific gravity (hereinafter, simply called a density). As is clear from a relationship at 10% evaporation point (evaporation point) shown in FIG. 3, an evaporation property becomes higher as the specific density becomes lower. That is, a distillation temperature becomes lower as the density becomes lower. The reason thereof is that aromatics having a benzene ring in light oil increases as the specific density becomes higher as shown in FIG. 4. That is, a cetane number of aromatics becomes lower (an octane number becomes higher) and an evaporation property of aromatics becomes lower as the density becomes higher. Since a viscosity is in proportion to a density, the cetane number tends to decrease in inverse proportion to the viscosity as shown in FIG. 5. This fact is different from the proportional relationship shown in Japanese Examined Utility Model Application No. 3-45181.

Figure 6:
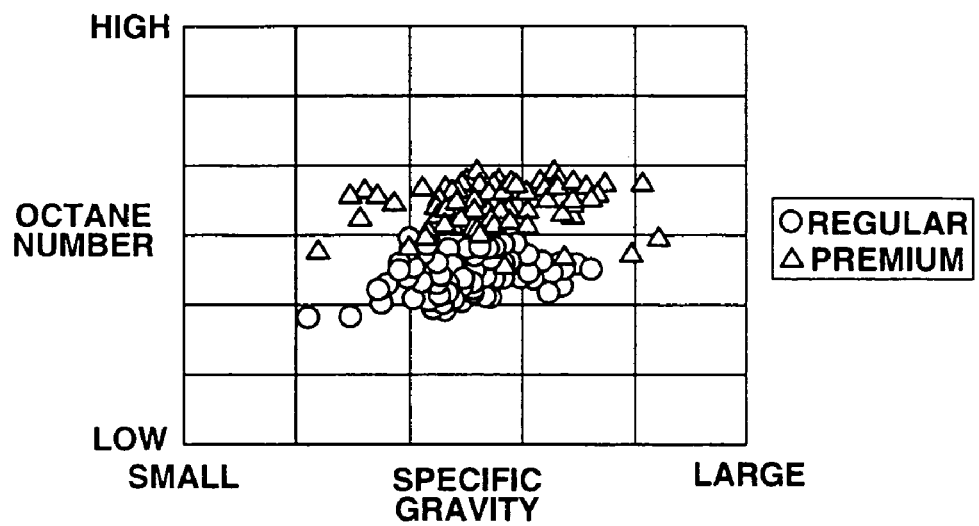
FIG. 6 is a graph showing a relationship between the specific gravity and an octane number of light oil.
Figure 7:
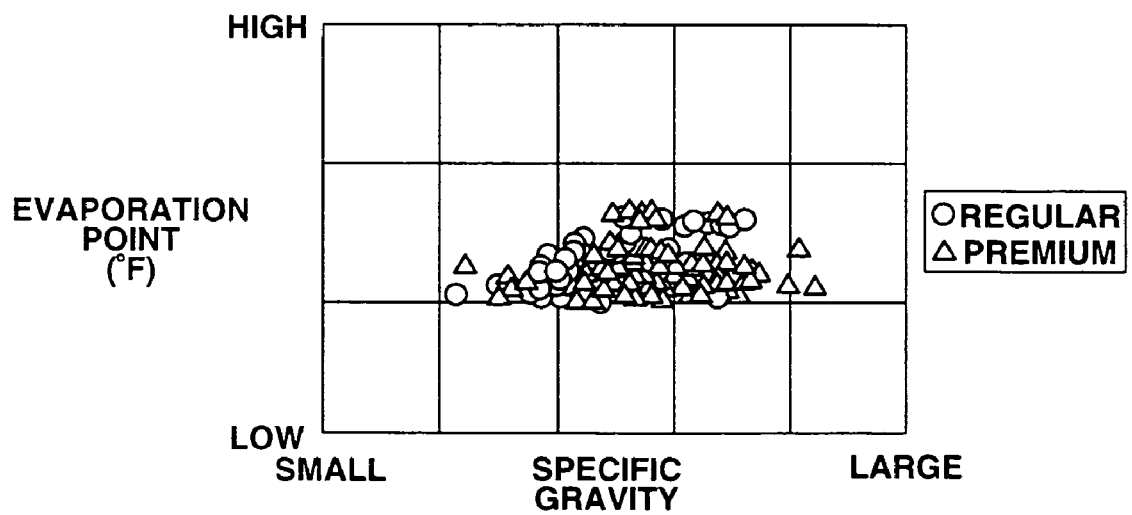
FIG. 7 is a graph showing a relationship between the specific gravity and an evaporation property (10% evaporation point) of gasoline.
Figure 8:
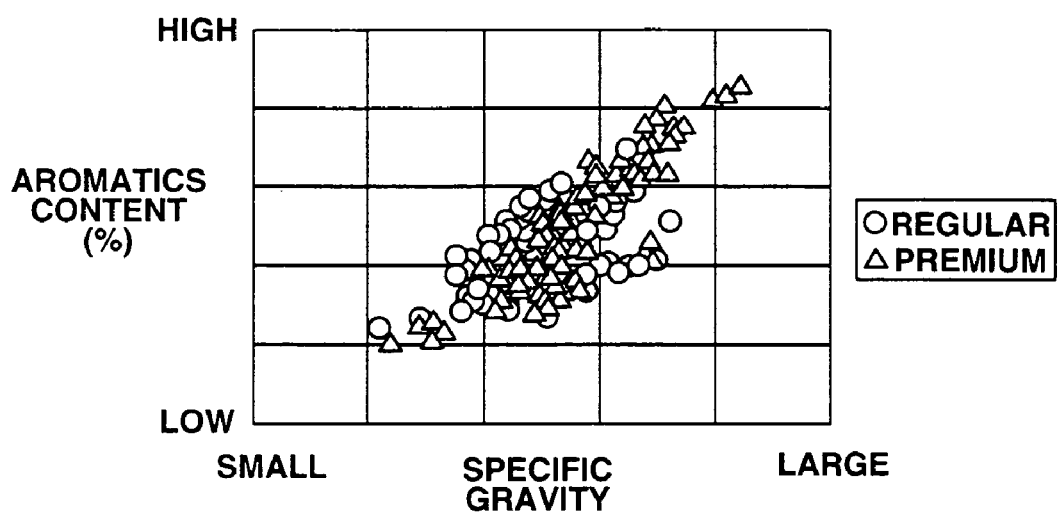
FIG. 8 is a graph showing a relationship between a specific gravity and an aromatics content of gasoline.
Figure 9:
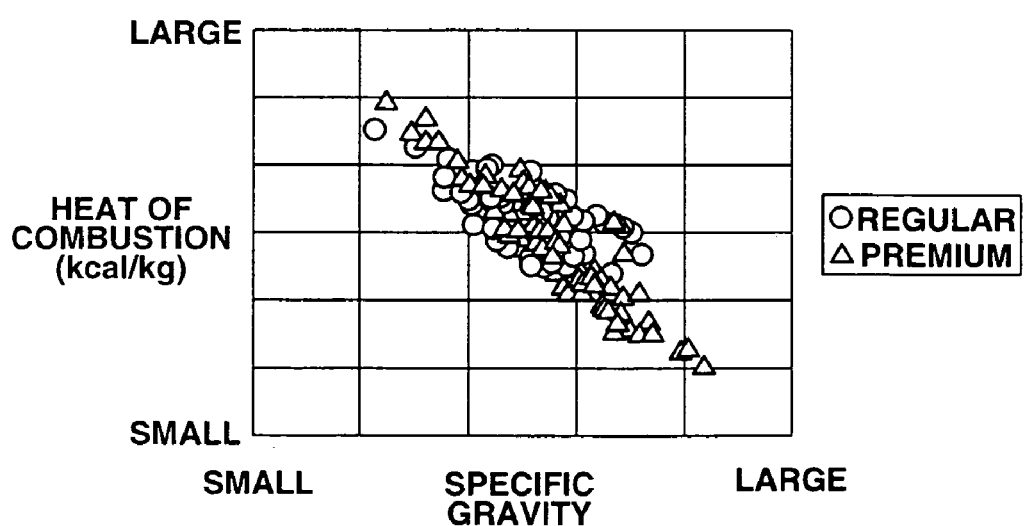
FIG. 9 is a graph showing a relationship between the specific gravity and heat of combustion of gasoline.

On the other hand, in case of gasoline, as shown in FIG. 8, a quantity of aromatics content increases as the density becomes higher as is similar to the tendency of light oil. As discussed above, the function of the cetane number is inverse to that of the octane number. In gasoline, the octane number becomes higher as the density becomes higher as shown in FIG. 6. As is clear from a relationship at 10% evaporation point shown in FIG. 7, an evaporation property becomes higher as the density becomes lower. That is, a distillation temperature becomes lower as the density becomes lower. FIG. 9 shows a relationship between the density and a heat of combustion. Since the aromatics component, whose H/C ratio is increased according to the increase of the density, the heat of combustion per a predetermined weight according to the increase of the density. This tendency of gasoline is also performed by light oil. Accordingly, it is possible to detect the fuel property such as the cetane number, the octane number, the evaporation property, the heat of combustion and the aromatics content, from the standard specific gravity (density) of fuel.

Subsequently, there is discussed a subroutine of the engine emission control executed at step S400 in FIG. 10, with reference to the flowchart shown in FIG. 12. Herein, in order to ensure a desired (determined) engine exhaust emission performance, the fuel injection timing control, the EGR (exhaust recirculation gas) control and the exhaust post-processing control are executed on the basis of the detected fuel property (cetane number), an operating area of engine 1 and an engine temperature such as a cooling water temperature Tw.

At step S410 control unit 30 executes a fuel injection timing control. More specifically, control unit 30 retrieves main fuel injection quantity Qmain, common-rail pressure PCR, main injection period Mpriod, main injection start timing Mstart from a plurality of mapped data which have been previously stored in ROM of control unit. Further, in order to supply main fuel injection quantity Qmain to engine 1, control unit 30 controls the opening operation of a fuel injector 15 at a cylinder to which the main injection is executed, for the main injection period Mperiod from injection start moment (timing) Mstart.

Referring to the relationship among the fuel injection timing, the cooling water temperature and the fuel property (cetane number), it is preferable that a correction control is executed so that the injection timing is advanced as the cooling water temperature becomes lower and as the cetane number becomes lower. By this correction control, the starting performance of engine 1 is improved, and therefore the fuel consumption and the emission performance of engine are also improved.

At step S420 control unit 30 executes EGR control. First control unit 30 determines whether or not it is necessary to execute the exhaust recirculation. More specifically, control unit 30 determines whether or not the engine operating condition is in a predetermined EGR area set by engine speed Ne and main fuel injection quantity Qmain acting as parameters. In other words, control unit 30 determines whether the engine operating condition is in a normal operating area wherein emission and the fuel consumption are not degraded by reducing the NOx through the execution of the exhaust gas recirculation (EGR) for the reason that the frequency of the operation is high and the air excess coefficient is relatively large, or in the other operating area wherein smoke and PM (particle matter) are increased and the output of engine 1 is lowered by the execution of the exhaust gas recirculation (EGR).

When the determination at step S420 is affirmative, that is, when control unit 30 determines that the engine operating condition is in the EGR zone, control unit 30 retrieves target EGR data (drive signals for EGR valve 5 and intake throttle valve 6) for executing a suitable EGR from a map which represents a relationship among target EGR data, engine speed Ne and main fuel injection quantity Qmain while employing engine speed Ne and main fuel injection quantity Qmain as parameters, and which has been previously stored in ROM of control unit 30.

When cooling water temperature Tw is smaller than a predetermined temperature, the quantity of EGR is decreased for the correction, and EGR valve 5 and intake throttle valve 6 are controlled to execute the EGR control on the basis of the corrected driving signal. When the engine operating condition is out of the EGR execution area and when it is not necessary to execute the EGR, control unit 30 outputs a command for stopping the EGR or maintaining the stopping state of the EGR by stopping the operations of EGR valve 5 and intake throttle valve 6.

At step S430 control unit 30 executes a post-processing of the exhaust gas. More specifically, there is provided a commonly-known NOx trap catalyst, which temporally adsorbs NOx in the exhaust gases when the exhaust air/fuel ratio is lean, and desorbs NOx into the exhaust gases when the oxygen density in the exhaust gas is lowered. This NOx trap catalyst is installed in casing 20.

During the recovery period of the NOx trap catalyst, by executing at least one of a closing reinforcement of the intake throttle (decreasing the opening of throttle valve 6), a closing reinforcement of EGR, and a post injection (a small-quantity fuel injection executed after the main fuel injection), the air/fuel ratio in the exhaust gases is put in a rich state to execute the recovery of the NOx trap catalyst.

With the thus arranged fuel property determination executed by the fuel property determination system according to the present invention, the following advantages are ensured.

(1) Since the specific gravity of fuel is obtained from the intake air quantity, the fuel supply quantity and the actual air/fuel ratio, it is possible to accurately determine the fuel property by means of a practical method.

(2) Since the fuel injection quantity is obtained from map data, which represents a relationship among the fuel injection quantity, engine speed and engine load, based on the detected engine speed and engine load, it is possible to construct this fuel supply quantity detecting means by functions previously provided in the engine system. Therefore, the fuel property determination system does not increase its production cost.

(3) Since the actual fuel supply weight is obtained by dividing the intake air quantity by the actual air/fuel ratio and the actual specific gravity is obtained by dividing the actual fuel supply weight by the main fuel injection quantity (fuel supply quantity), it is possible to accurately detect the actual air/fuel without increasing the production cost of the system.

(4) Since the fuel property is obtained by obtaining the standard specific gravity taking account of the fuel temperature, it becomes possible to further accurately detect the fuel property.

While the embodiment according to the present invention has been shown and described such that actual fuel supply weight Gmain is obtained by dividing intake air flow rate Qair by actual air/fuel ratio AFreal, actual specific gravity Gfuel is obtained by dividing actual fuel supply weight Gmain by main fuel injection quantity (fuel supply quantity) Qmain, and standard specific gravity Gstd is obtained by correcting actual specific gravity Gfuel by fuel temperature TF, it will be understood that the present invention is not limit to this and standard specific gravity Gfuel may obtained by other method, such as a method of obtaining fuel injection quantity Qmain from fuel injection period Mperiod and common-rail pressure PCR in fuel injection apparatus 10 for engine 1, obtaining standard fuel injection weight Gmain from fuel injection quantity Qmain, a preset standard fuel specific gravity $\gamma_{std}$ and fuel temperature TF, obtaining a standard air/fuel ratio AFstd from standard fuel injection weight Gmain and an air weight Gair detected by airflow meter 7, and obtaining actual fuel specific gravity $\gamma_{real}$ by comparing standard air/fuel ratio AFstd and actual air/fuel ratio AFreal detected by air/fuel ratio sensor 37.

This application is based on Japanese Patent Application No. 2003-31832 filed on Feb. 10, 2003 in Japan. The entire contents of this Japanese Patent Application are incorporated herein by reference.

Although the invention has been described above by reference to a certain embodiment of the invention, the invention is not limited to the embodiment described above. Modifications and variations of the embodiment described above will occur to those skilled in the art, in light of the above teaching. The scope of the invention is defined with reference to the following claims.

What is claimed is:

1. A fuel property determination system for an internal combustion engine, comprising:
 an intake air quantity detecting section which detects an intake air quantity;
 a fuel supply quantity detecting section which detects a fuel supply quantity;

an actual air/fuel ratio detecting section which detects an actual air/fuel ratio;
a specific gravity detecting section which obtains a specific gravity of fuel used in the engine on the basis of the intake air quantity, the fuel supply quantity, and the actual air/fuel ratio; and
a fuel property detecting section which detects at least one of a cetane number, an octane number, an evaporation point, a heat of consumption and an aromatics content as a fuel property, on the basis of the specific gravity.

2. The fuel property determination system as claimed in claim 1, further comprising a revolution speed detecting section which detects a revolution speed of the engine; and a load detecting section which detects a load of the engine;
wherein the fuel supply quantity detecting section retrieves a fuel injection quantity from a map indicative of a relationship among the revolution speed, the load and the fuel injection quantity.

3. The fuel property determination system as claimed in claim 1, wherein the engine comprises a common rail type fuel injection system that includes a load detecting section which detects a load of the engine, a fuel injection pressure detecting section which detects a fuel injection pressure of the fuel injection system, a revolution speed detecting section which detects a revolution speed of the engine, and a load detecting section which detects a load of the engine;
wherein the fuel supply quantity detecting section retrieves a fuel injection timing of the fuel injection system from a map indicative of a relationship among the revolution speed, the load and the fuel injection timing;
wherein the fuel supply quantity detecting section obtains a fuel injection quantity from a map indicative of a relationship among the fuel injection timing, the fuel injection pressure and the fuel injection quantity.

4. The fuel property determination system as claimed in claim 1, wherein the intake air quantity detecting section comprises an airflow meter provided in an intake system of the engine, the intake air quantity detecting section retrieving the intake air quantity from a map indicative of a relationship between a signal outputted from the airflow meter and the intake air quantity;
wherein the actual air/fuel ratio detecting section comprises an air/fuel ratio sensor provided in an exhaust system of the engine, the actual air/fuel ratio detecting section retrieving the actual air/fuel ratio from a map indicative of a relationship between a signal outputted from the air/fuel sensor and the actual air/fuel ratio, and
wherein the specific gravity detecting section obtains an actual fuel supply weight by dividing the intake air quantity by the actual air/fuel ratio, the specific gravity detecting section obtaining an actual specific gravity by dividing the actual fuel supply weight by the fuel supply quantity detected.

5. The fuel property determination system as claimed in claim 4, further comprising a fuel temperature detecting section which detects a temperature of fuel supplied to the engine;
wherein the fuel property detecting section retrieves a standard specific gravity at a standard temperature from a map indicative of a relationship among the actual specific gravity, the fuel temperature and the standard specific gravity, and retrieves the fuel property from a map indicative of a relationship between the fuel property and the standard specific gravity.

6. A fuel property determination system for an internal combustion engine, comprising:
a specific gravity detecting section which detects a specific gravity of fuel used in the engine; and
a fuel property detecting section which detects at least one of a cetane number, an octane number, an evaporation point, a heat of consumption and an aromatics content as a fuel property, on the basis of the specific gravity;
wherein the specific gravity detecting section executes the detection of the specific gravity only when an exhaust gas recirculation to the engine is stopped.

7. A fuel property determination system for an internal combustion engine, comprising:
a specific gravity detecting section which detects a specific gravity of fuel used in the engine;
a fuel property detecting section which detects at least one of a cetane number, an octane number, an evaporation point, a heat of consumption and an aromatics content as a fuel property, on the basis of the specific gravity; and
a fuel injection quantity detecting section which obtains a fuel injection quantity from a fuel injection period and an injection pressure of a fuel injection apparatus of the engine, a fuel injection weight detecting section which obtains a standard fuel injection weight from the fuel injection quantity, an intake air quantity detecting section which detects an intake air quantity, a standard air/fuel ratio obtaining section which obtains a standard air/fuel ratio from the standard fuel injection weight and the intake air quantity, and an actual air/fuel ratio detecting section which detects an actual air/fuel ratio;
wherein the specific gravity detecting section obtains an actual specific gravity by comparing the standard air/fuel ratio and the actual air/fuel ratio.

8. A fuel property determination system for an internal combustion engine, comprising:
first means for obtaining a fuel injection quantity from a fuel injection period and a injection pressure of a fuel injection apparatus of the engine;
second means for obtaining a standard fuel injection weight from the fuel injection quantity, a standard fuel specific gravity and a fuel temperature;
third means for obtaining a standard air/fuel ratio from the standard fuel injection weight and an intake air quantity detected by an airflow meter; and
fourth means for obtaining an actual specific gravity by comparing the standard air/fuel ratio and an actual air/fuel ratio detected by an air/fuel ratio sensor.

9. A method of determining a property of fuel used in an internal combustion engine, comprising:
detecting an intake air quantity;
detecting a fuel supply quantity;
detecting an actual air/fuel ratio;
obtaining a specific gravity of fuel used in the engine on the basis of the intake air quantity, the fuel supply quantity, and the actual air/fuel ratio; and
detecting at least one of a cetane number, an octane number, an evaporation point, a heat of consumption and an aromatics content as a fuel property, on the basis of the specific gravity.

10. A fuel property determination system for an internal combustion engine, comprising:
intake air quantity detecting means for detecting an intake air quantity;
fuel supply quantity detecting means for detecting a fuel supply quantity;

actual air/fuel ratio detecting means for detecting an actual air/fuel ratio;

specific gravity detecting means for obtaining a specific gravity of fuel used in the engine on the basis of the intake air quantity, the fuel supply quantity, and the actual air/fuel ratio; and fuel property detecting means for detecting at least one of a cetane number, an octane number, an evaporation point, a heat of consumption and an aromatics content as a fuel property, on the basis of the specific gravity.

* * * * *